United States Patent

[11] 3,634,755

| [72] | Inventors | Alexander M. Nicolson<br>Concord;<br>Gerald F. Ross, Lexington, both of Mass. |
|---|---|---|
| [21] | Appl. No. | 819,288 |
| [22] | Filed | Apr. 25, 1969 |
| [45] | Patented | Jan. 11, 1972 |
| [73] | Assignee | The United States of America as represented by the Secretary of the Air Force |

[54] SYSTEM TO MEASURE THE FREQUENCY DOMAIN RESPONSE OF A RADAR COMPONENT
8 Claims, 2 Drawing Figs.

[52] U.S. Cl. .................................................... 324/57 R,
181/.5, 235/156, 340/15.5, 324/77 R
[51] Int. Cl. .................................................... G01r 27/00

[50] Field of Search ........................................... 324/77, 57;
181/.5; 340/15.5; 235/152, 156

[56] References Cited
UNITED STATES PATENTS
3,462,381  8/1969  Nelson et al. ................. 324/0.5

*Primary Examiner*—Edward E. Kubasiewicz
*Attorneys*—Harry A. Herbert, Jr. and George Fine ABSTRACT: A system for translation between time and frequency domains. Voltage impressions from a generator are applied to an electrical system under test, and the waveform of the reflected or transmitted response is recorded on a broadband sampling system, and Fourier transforms are applied to this recorded information in a computer so that the frequency domain response of the system under test may be obtained over a broad range of frequencies.

SYSTEM TO MEASURE THE FREQUENCY DOMAIN RESPONSE OF A RADAR COMPONENT

BACKGROUND OF THE INVENTION

This invention relates to analyzers that operate in the time domain and more particularly to a system for translation between time and frequency domains.

Components for wideband radars, particularly those using a pulse compression method frequently require close tolerance in both amplitude and phase in order to define their system functions. For a wideband component requiring measurements with a high resolution in the frequency domain, the prior art measurements become very time consuming. Because of this, various computer-controlled frequency domain network analyzers have been developed.

SUMMARY OF THE INVENTION

The present method and system concerns analyzers that operate on the time domain. Voltage impulses are applied to the system under test and the system response is recorded. Fourier transforms are applied to this recorded information in computer so that the equivalent frequency domain response can be computed. It is possible to select a segment of a waveform that is to be sampled for a time domain measurement so that reflections from impedance mismatches in the system may be gated out if they are displaced in time from the sampled signal. The time domain measurements also permit the simultaneous measurement of time and frequency domain characteristics when a real time analyzer is used.

Such analyzers measure the system function of a component by first measuring the spectrum of some signal source and then measuring the resultant spectrum when the signal from that source is passed through the component. $F_i(\omega)$ and $F_o(\omega)$ are formed from a finite train of samples taken at specified intervals ($T$ seconds). The value of $F_{ts}(\omega)$ may then be calculated from the formula $$F_{ts}(\omega) = \sum_{n=0}^{N-1} f(nT) \epsilon^{-in\omega T}$$

This approximates the Fourier transform $F(\omega)$ of $f(t)$. The finite number of time samples results in a limit to the frequency resolution of the measurement such that the value $F_{ts}(\omega)$ may be completely described through an interpolation formula from its values at discrete frequencies which are integer multiples of $1/NT$. Errors due to truncation in the time domain and to aliasing in the frequency domain may be reduced to an acceptable level by appropriate choice of the total sampled period $NT$, and the sampling interval $T$, respectively.

An object of the present invention is to provide a method and system for translation between time and frequency domains.

Another object of the present invention is to provide a system for simultaneously measuring time and frequency domain characteristics when a real time analyzer is utilized.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

DESCRIPTION OF THE PREFERRED EMBODIMENTS

Figure 1:
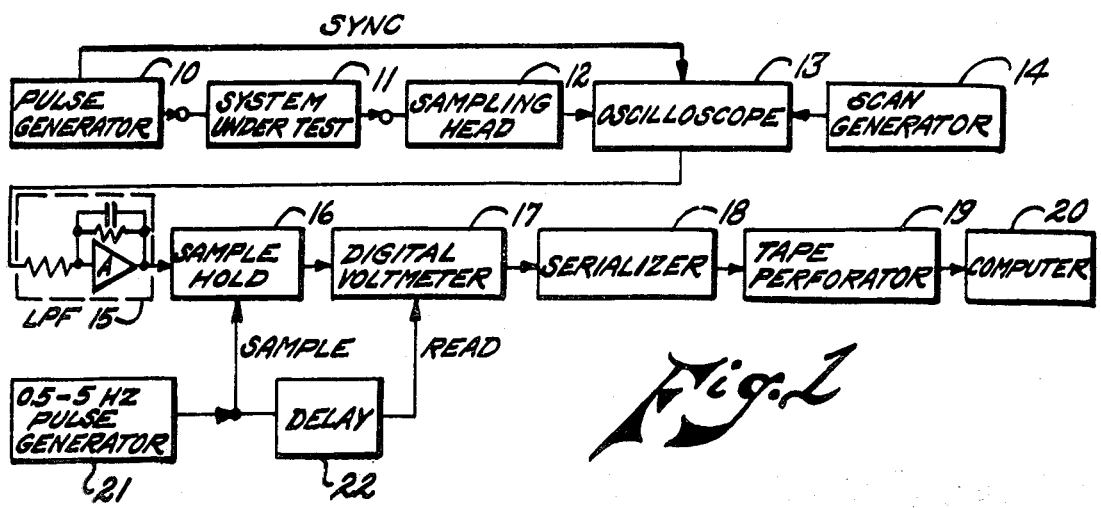
FIG. 1 shows a preferred embodiment in block diagram form of a system for translation between time and frequency domain.

Now referring in detail to FIG. 1, an impulse from pulse generator 10 is applied to system 11 which is under test. The response signal of system 11 is applied to sampling head 12 of oscilloscope 13. Oscilloscope 13 also receives a synchronization signal from generator 10. Oscilloscope 13 may be the conventional type of a commercial sampling oscilloscope having an associated sampling head. Sampling oscilloscope 13 functions as a high-speed sample-and-hold device. A sampling oscilloscope such as the Hewlett-Packard 12 GHz. oscilloscope is suitable for this purpose. This oscilloscope permits a sampling gate of about 30 picoseconds. Successive samples are taken for each pulse from pulse generator 10. In response to an incoming, slowly rising voltage ramp to oscilloscope 13 from scan generator 14, the equivalent time position of successive samples is moved slowly along the waveform. During one complete cycle of the ramp, a "time stretch" sample-and-hold version of the response is available from the oscilloscope. Scan generator 14 may comprise a motor driven helical potentiometer.

The output from oscilloscope 13 is a staircase waveform which is amplified and filtered in low pass filter 15. Filter 15 acts as a continuous integrator to reduce sampling noise. The output of filter 15 is sampled in sample/hold circuit 16 so that it can be converted into digital form in digital voltmeter 17. Sample/hold circuit 16 also receives a sampling pulse from pulse generator 21. Digital voltmeter 17 receives a read pulse from pulse generator 21 by way of delay 22. The reading of digital voltmeter 17 is transformed into a serial mode by serializer 18 and recorded by means of tape perforator 19. The information on the perforated tapes is then applied to computer 20 so that the value of $F_{ts}(\omega)$ may be computed from the formula mentioned previously. To provide digital information in a serial mode as provided by serializer 18 is conventional in the digital art and is traditionally performed by a rotary switch or a multiplexer, etc. It is emphasized that to provide digital information in serial form for recording and then utilization in a programmed computer is conventional procedure.

Figure 2:
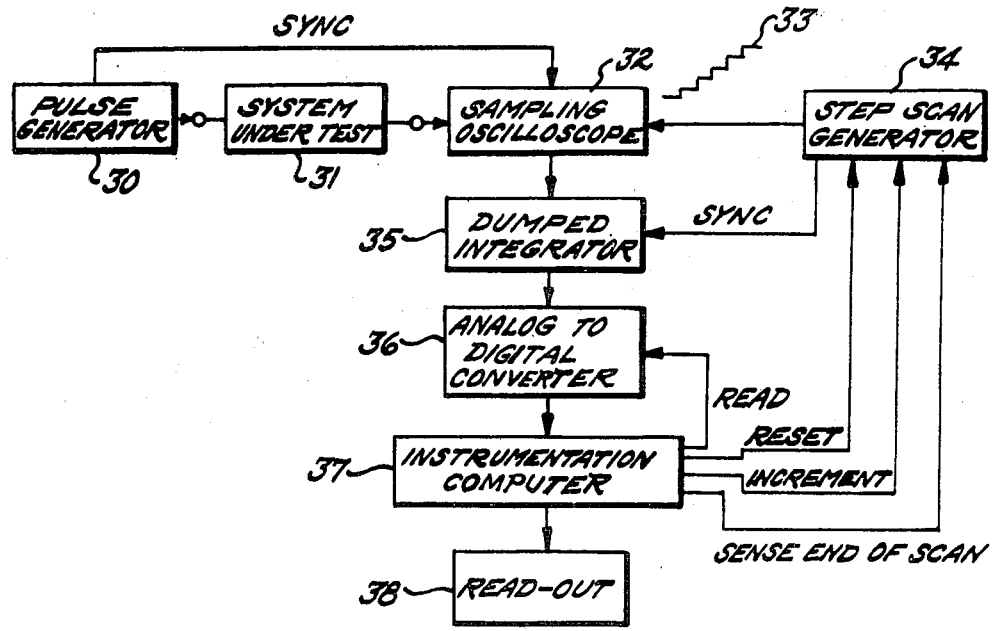
FIG. 2 shows a second contemplated embodiment of the invention.

Now referring to FIG. 2, there is shown a second version of a system for translation between time and frequency domain. A small, real-time computer would be included in the equipment. Since rapid computations require feedback of the results of the measurements within a few minutes, the production of perforated tapes as used in the original measurements requires considerable time when using large numbers of samples.

The system also includes a step scan generator which provides a staircase voltage to the oscilloscope. This permits the time position to be held for a finite time during integration of the oscilloscope sample. This, in turn, permits the dumped integrator to be used in place of a continuous integrator thereby improving the averaging function of the circuit. Now referring in greater detail to FIG. 2, there is shown pulse generator 30 applying a pulse to system 31 which is under test. The response is applied to sampling oscilloscope 32 which is identical to that shown in FIG. 1. Sampling oscilloscope 32 also receives a synchronizing pulse from pulse generator 30. Simultaneously sampling oscilloscope receives a staircase voltage 33 from step scan generator 34 permitting the time position to be held for a finite time during integration of the oscilloscope sample. This, in turn, permits dumped integrator 35 to be used in place of a continuous integrator, thereby improving the averaging function of the circuit. Dumped integrator receives the output from sampling oscilloscope 32 and a synchronizing signal from step scan generator 34. The output from dumped integrator 35 is fed to analog to digital converter 36. Instrumentation computer 37 receives the output from analog to digital converter 36. Instrumentation computer 37 feeds a read signal to analog to digital converter 36, reset and increment signals to step scan generator 34. Step scan generator 34 feeds a sense end of scan signal to instrumentation computer 37. Instrumentation computer feeds the resultant signal to readout circuit 38.

In prior measurements solely in the frequency domain, errors which are impossible to remove have occurred due to mismatches at the input and output ports of the system under test 11 or 31 with the transmission lines connected to these ports. In the time domain measurement being described, however, errors due to these mismatches may be eliminated by appropriate choice of the lengths of transmission line between pulse generator 10 or 30 and system-under-test 11 or 31, and between system-under-test 11 or 31 and sampling head 12 or 32, such that reflected signals are displaced in time beyond the measured period of the transient response $NT$.

While the above description has related to the measurement of the transmission properties of the system-under-test 11 or 31, it is intended to include also within the compass of this disclosure a rearrangement of the pulse generator 10 or 30, the system-under-test at either of its ports. For example, if the sampling head 12 has a straight-through capability, then it may be interposed between pulse generator 10 and system-under-test 11, with the other port of the latter appropriately terminated. Then by appropriate choice of time domain measurement window, the signal reflected from the adjacent port of the system-under-test may be measured on the sampling head.

While in accordance with the provisions of the statutes, I have illustrated and described the best forms of the invention now known to me, it will be apparent to those skilled in the art that changes may be made in the form of the system disclosed without departing from the spirit of the invention as set forth in the appended claims, and that in some cases certain features of the invention may be used to advantage without a corresponding use of other features.

What is claimed is:

1. A system for translation between time and frequency domain comprising a system under test, means to apply a voltage impulse to said system under test to provide a response signal therefrom, first sample-and-hold means receiving said response signal, means to generate a slowly rising voltage waveform for application to said first sample-and-hold means operating so that the equivalent time position of successive samples are moved slowly along the waveform to provide a staircase output signal from said first sample-and-hold means, means to integrate said staircase signal to reduce sampling noise and provide an integrated signal, second sample-and-hold means receiving said integrated signal to permit conversion thereof to digital form, means to convert the output signal from said second sample-and-hold means from an analog to a digital signal, means to transform said digital signal into a serial mode, means to record said signal transformed into a serial mode, and computer means receiving said recorded signal with Fourier transforms being applied to said recorded signals so that the equivalent frequency domain response can be computed.

2. A system as described in claim 1 wherein said first sample-and-hold means is comprised of a sampling oscilloscope.

3. A system as described in claim 1 wherein said means to generate a slowly rising voltage ramp waveform is comprised of a scan generator.

4. A system as described in claim 1 wherein said integrator means is comprised of a low pass filter.

5. A system as described in claim 1 further including means to generate a sampling pulse for application to said second sample-and-hold means, means to delay said sampling pulse prior to reception thereof by said analog to digital converter means for reading thereof.

6. A system as described in claim 5 wherein said analog to digital converter means is comprised of a digital voltmeter.

7. A system as described in claim 1 wherein said recording means is comprised of a tape perforator.

8. A system as described in claim 1 wherein said time delaying media is comprised of lengths of transmission line.

* * * * *